Dec. 14, 1965     M. G. DREYFUS     3,222,978

SURFACE ROUGHNESS METER

Filed Aug. 4, 1961

*INVENTOR.*
MARC G. DREYFUS
BY
*ATTORNEY*

United States Patent Office 3,222,978
Patented Dec. 14, 1965

3,222,978
SURFACE ROUGHNESS METER
Marc G. Dreyfus, Stamford, Conn., assignor to Barnes Engineering Company, Stamford, Conn., a corporation of Delaware
Filed Aug. 4, 1961, Ser. No. 129,266
12 Claims. (Cl. 88—14)

This invention relates to an optical surface roughness meter.

The problem of measuring surface roughness is a very serious one when the roughness becomes quite small, for example when the R.M.S. roughness gets down to about 10 microinches and especially 5 microinches or less. Ordinarily surface roughness is measured with a profilometer in which a specially designed diamond stylus is moved across the material. With very hard materials and with surface roughness in the range of 50 to 100 microinches or more, the profilometer is a satisfactory instrument. However, when the material is soft or for other reasons a contact measurement is undesirable, the profilometer is no longer applicable. Also, when the roughness gets down to 10 microinches and even more at 5 or below, the accuracy of the profilometer becomes so low that the instrument cannot practically be used in these ranges even with hard material. However, it is just in this range that many important roughness measurements become necessary, for example the surface of precision ball bearings and races and the like.

It has been proposed in the past to use optical methods in which reflection at normal incidence is compared with reflection at an angle. These meters have been useful for measuring gloss, that is to say, the proportion of specular reflectance as opposed to diffuse reflectance in various coatings and the like. The gloss meters, however, are not accurate as roughness meters even if it were attempted to compute from their readings something that would give a measure of diffuse reflectance. The oblique incidence of light gives a reflectance which is greatly influenced by the R.M.S. slope of the surface profile and so reflection results are entirely different with the same R.M.S. surface roughness when the surface roughnesses have different R.M.S. slopes. This has limited the usefulness of gloss meters for quantitative roughness measurements, particularly in the range of from 10 microinches down and at best only gross qualitative indications of poor reproducibility can be obtained.

The present invention utilizes a particular type and organization of two-color photometer to measure roughness. The incident light used is normally in a very narrow angle about normal incidence and great accuracy is obtainable, far beyond anything given by a profilometer even with very hard material particularly in the range below 5 microinches. It has been determined that at normal incidence the reflection is an exponential function of the square of the R.M.S. roughness in which the ratio of R.M.S. roughness to the wavelength reflected is a factor in the exponent. The instruments of the present invention translate the ratio of reflectances at two different wavelengths into a result from which the surface roughness can be derived, preferably automatically by the operation of the instrument. Instruments using the difference of the reflectances are also useful but somewhat less precise.

As stated above, the instrumental solution of the problem might appear prima facie feasible. However, there are other factors which render a direct solution, generally applicable to all ranges of roughness impossible, or so complex as to be impractical.

The principal factor which requires definite limitations on the instrument is the effect of the slope of the surface roughness. Variations in R.M.S. slope introduce an error which is proportional to the square of the angular spread of the light beam at normal incidence. Another factor, which is involved at an even higher power, is the ratio of surface roughness to wavelength of the radiation used. The present instrument, therefore, is designed so that this slope error becomes sufficiently small so that it can be neglected. First the light should strike the sample substantially at normal incidence, secondly the angular spread should be kept small and third the ratio between surface roughness and radiation wavelength should also be kept small. For practical purposes it is desirable to make the angular spread not substantially more than 6° or .1 radian and the ratio between minimum wavelength of radiation used and surface roughness should be at least 10 and preferably around 30 or more. When these precautions are taken the error due to the slope of the surface roughness can be neglected and as will appear from a more detailed description below, a very simple instrument becomes possible and in a preferred embodiment one which is direct reading.

Sometimes the slope of the surface roughness is of interest, particularly where the roughness is oriented and not entirely random. It is possible to widen out the angular spread of the light beam and obtain a second reading from which the slope of surface roughness can be computed. Therefore, while it is an important factor in the instrument that a small angular spread of the radiation be available it is not necessary that this small spread be fixed and for some purposes an instrument which permits readings at small angular spread and at a larger one has uses and is, therefore, not excluded from the present invention.

When used in its normal mode with the small angular spread of radiation beam and the other limiting factors the present instrument performs something that has not been possible with optical instruments of the gloss meter type, namely the measurement of R.M.S. roughness with high precision regardless of variation in the R.M.S. slope of the surface irregularities and regardless of whether the roughness is random or oriented. This new result is of great practical importance.

While the radiations used in the instrument can be any optical radiation (i.e. ultraviolet, visible or infrared), the preferred results are obtained with somewhat longer wavelengths than visible light. For example two wavelength bands in the near infrared are desirable. With sufficiently fine surface roughness an instrument operating on the two-color principle described above can, in principle, be used in visible light only or with one color of the two-color photometer in the visible and the other in the infrared. With these shorter wavelengths color differences sometimes present problems. Surfaces tend to reflect much more like gray bodies in the infrared than in the visible. However, where the nature of the material, the roughness of which is to be measured, permits, radiations in the visible may be used. As most of the practical instruments, according to the present invention, are particularly designed for measuring the vitally important range of roughness below 50 microinches and especially below 5 microinches near infrared instruments are preferred, and, therefore, in the specific description which will follow such instruments will be described, it being understood that the invention in its broader aspects is not limited to the use of radiations in the infrared.

Because of the difference in specular reflectance and other factors, the most precise and flexible type of instrument included in the present invention is a nulling instrument. However, for many purposes it is possible to design an instrument which is direct reading. Where speed of measurement is a vital factor such instruments present important advantages. The resulting instrumentation is thus very flexible and serves a large number of diverse operating requirements.

The invention will be described in connection with two typical instruments, one a pure null instrument and the other permitting direct reading.

The invention will be described in greater detail in conjunction with the drawings in which.

Figure 1:
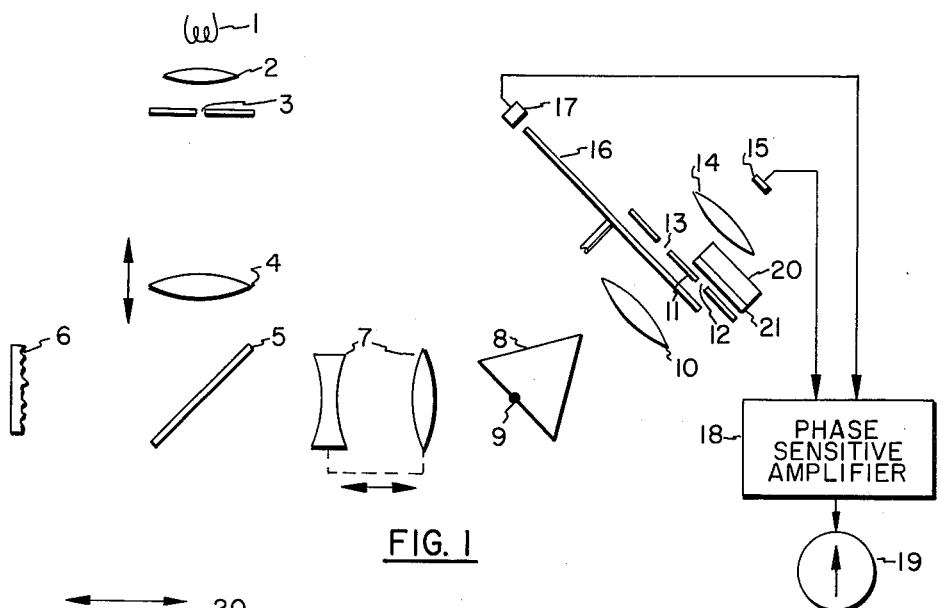
FIG. 1 is a diagrammatic representation of a null instrument.

In FIG. 1 a radiation source 1, such as an incandescent lamp which radiates in the visible and the near infrared, produces a beam of light which is condensed by the lens 2 and passes through a pinhole 3 in a plate. In a practical instrument this pinhole may be approximately 0.031" in diameter. The beam from the pinhole is focused by a lens 4 and is split by a beam splitter 5. One beam is focused onto the roughness sample or sample holder 6. The light passing through the beam splitter 5 is rejected. From the roughness sample reflected light passes through the beam splitter 5, is collimated by conventional optics 7 and transmitted to a prism 8 which can be pivoted about the point 9 to choose different portions of the spectrum generated at the plane of a mask 11. The dispersed light is then imaged by the lens 10 onto the plane of the mask 11 provided with two slits 12 and 13. The particular spectral bands transmitted by these slits pass through a field lens 14 onto a lead sulfide detector 15. The beams are chopped by a conventional chopper 16 turned by a motor (not shown). The chopper incorporates conventional reference wave generating means shown diagrammatically as a pickup coil 17 which cooperates with a magnetic insert in the chopper (not shown). Any other type of reference generator may be used, such as an opening with a light and a photocell. The output from the radiation detector 15 is then introduced into a phase sensitive amplifier 18 which also receives the reference square wave from the pickup 17. The difference in the signals from the two beams through the slits 12 and 13 actuates the zero center meter 19, the polarity of actuation being determined by the relative intensity of the two beams.

Figure 2:
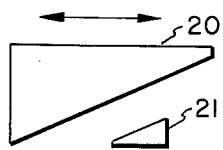
FIG. 2 is a detail of the attenuator used in FIG. 1.

Two wedges 20 and 21 are used as an attenuator in one of the beams, namely the one passing through slit 12. These wedges are shown in FIG. 2 and are composed of a large wedge 20 which is movable and a small wedge 21 which is stationary. Motion in FIG. 1 is in a direction at right angles to the plane of the drawing. The movement of the wedge 20 is by a conventional micrometer screw movement and is, therefore, not shown. The scale of the micrometer may be linear with a vernier or it may be a special scale reading the square root of the movement of the wedge 20. This scale has an advantage as will be pointed out below.

In operation when the instrument has been calibrated, for example on a sample with zero roughness or on a roughness sample of known R.M.S. roughness, a sample, the roughness of which is to be measured, is introduced at 6 and the wedge 20 is moved until the meter 19 shows zero. It should be noted that the movement of the wedges results in a logarithmic attenuation and as the square of the R.M.S. roughness is in an exponent for both beams, the movement of the wedge 20 is a linear function of the square of the R.M.S. roughness. This is the reason why a special scale reading the square root of motion is of advantage, because the scale can then be made to read R.M.S. roughness directly instead of its square.

In a practical instrument, the wavelength of the shorter wave of the two beams through the slits 12 and 13 should preferably be from 10 to 30 times longer than the R.M.S. roughness. For measurements in the range of 1 microinch to about 10 microinches, suitable wavelengths are approximately $0.8\mu$ and about $2.5\mu$. For other ranges of roughness different wavelengths can be used, and this can be effected by turning prism 8. Ordinarily even for a versatile laboratory instrument a few pairs of wavelengths will suffice and so the movement of the prism may be to a limited number of predetermined positions, for example as determined by conventional stops.

The instrument measures R.M.S. roughness in the range referred to above with accuracy and does not damage the surface, something which is impossible in this range with a profilometer. When coarser roughnesses are to be measured, the present instrument is still useful though of course it may be necessary to utilize somewhat longer wave infrared in order to maintain the desired ratio between wavelength and surface roughness. Even in ranges and with hard materials where a profilometer can be used, the present instrument gives a reading which is more constant where the roughness is oriented. When scratches are parallel to each other, the profilometer reading will change depending on the direction in which the stylus is moved across the surface, whereas the optical measurement depends on the spectral effect of the R.M.S. roughness value and is substantially insensitive to sample orientation. It, therefore, gives improved results even in a range where the old-fashioned profilometer could be used.

As noted above, the logarithmic transmittance function generated by the wedge 20 results in a wedge motion which is proportional to the square of the R.M.S. roughness when the electrical meter 19 is nulled. It should be noted that the wedge attenuator assembly can be removed and its function performed equivalently by using a nonlinear amplifier with a logarithmic amplication characteristic as the phase sensitive amplifier 18. In this case the electrical signal which is metered at the output of the logarithmic amplifier is proportional to the square of the R.M.S. surface roughness, and may be read as a direct indication of the R.M.S. roughness after the instrument has been calibrated on a sample of zero or known roughness. The reading of the meter, on the output of the logarithmic phase sensitive amplifier is then analogous to the previously described reading of the wedge micrometer scale when meter 18 is zeroed.

Figure 3:
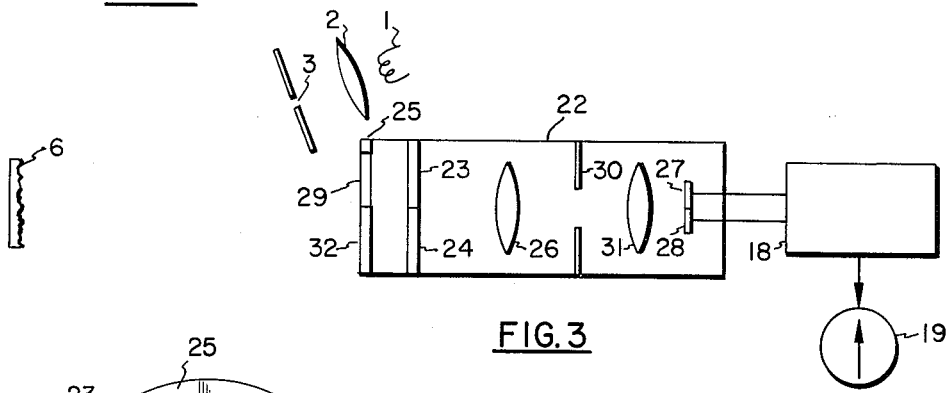
FIG. 3 is a semidiagrammatic section of simplified instrument.
Figure 4:
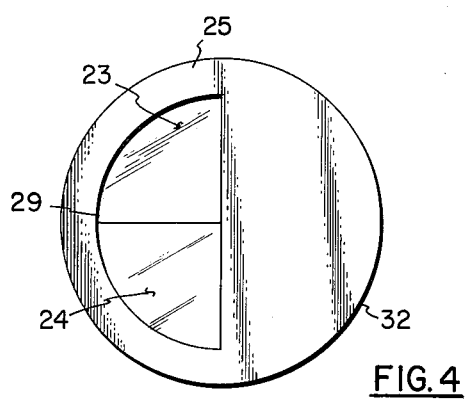
FIG. 4 is an elevation of the optical attenuator of FIG. 3.

For some purposes a very cheap and rugged instrument is desirable and such an instrument is shown in FIGS. 3 and 4, corresponding parts bearing the same reference numerals. In this system the source 1 illuminates a pin hole 3 of similar design to that shown in FIG. 1. This produces a beam of small angular divergence which, however, does not strike the sample 6 exactly at normal incidence. It is about 0.1 radian off normal. However, the angle of the beam is sufficiently close to normal so that the magnitude of second order errors remains within practical operating tolerances.

The reflected beam from sample 6 enters a radiometer which is mounted in a tube 22. Within the tube are two semicircular filters 23 and 24, one passing a narrow band at $0.8\mu$ and the other centered at $1.5\mu$. Rays pass through the two filters and then through objective 26, continuing on through the field stop 30 and field lens 31 to illuminate the two halves 27 and 28 of a split detector. Each half receives radiation from a single filter only. In front of the filters is a rotatable cap 25 provided with a suitable angular scale which is not shown. This member has a solid portion 32 and a semicircular opening 29. The cap is shown in FIG. 4 at the position where the beams through the two filters are equally attenuated (i.e. halved), by the cap. For convenience this setting corresponds to 45° on the angular scale, while at 90° filter 23 is ¾ open and filter 24 is ¼ open. At 135° filter 23 is completely opened and filter 24 is completely closed.

The differential output passes through an amplifier 18. The amplifier output registers on a meter 19. The operation of the instrument can best be considered by reciting the sequence of a measurement. First a standard surface is placed at 6. This may be a completely smooth surface with zero R.M.S. roughness or it may be a sample of known R.M.S. roughness. The cap 25 is then turned until the meter 19 shows zero ouptut. The angular setting of the cap 25 will be designated as $\theta_1$. The sample of which the roughness is to be measured is then inserted and again the cap 25 is turned until once more there is a null reading on the meter. The resulting angular setting of the cap will be designated as $\theta_a$. The ratio of the exposed areas of the two filters is defined by the following fraction:

$$\frac{135° - \theta}{45° + \theta}$$

For convenience in computation a quantity N will be defined as follows:

$$N_a = \frac{45 + \theta_a}{135 - \theta_a} \times \frac{135 - \theta_1}{45 + \theta_1}$$

As has been pointed out before the square of the R.M.S. roughness is an exponent in an exponential equation. For computation purposes the logarithm of $N_a$ is used and the following relation is obtained which also includes the modulus for changing natural logarithms into common logarithms:

$$\sigma_a^2 - \sigma_1^2 = 23.7 \log_{10} N_a$$

It will be noted that the simple computation set out above will give the difference between the R.M.S. roughness squares of the sample and standard. This makes the instrument of more general use but, of course, if the standard used is perfectly smooth the last computation will give the square of the R.M.S. roughness of the sample directly. In such cases the computation is simplified.

It should be noted that FIG. 3 represents an extremely simple, cheap and rugged instrument. However, it does have some operating limitations. The reflected beam from the sample 6 is not necessarily absolutely uniform and therefore the portion of the beam striking filter 23 may be slightly different from that striking filter 24. With a small pinhole 3, for example, one which illuminates an area on the sample 0.125" in diameter, this presents no problems provided the sample is flat. However, if the roughness sample is curved the two filters 23 and 24 may not receive equal amounts of radiation. In the case of the instrument in FIGS. 1 and 2, however, the beam is transformed into the two spectral bands and both come from the same beam. This more complicated instrument permits the measurement of surfaces which are not flat and in fact extends the present invention to curved surfaces such as spherical surfaces of reasonable curvature. It now becomes possible to measure the R.M.S. roughness of spheres which is of importance in the ball bearing industry.

While there are limitations to the precision of measurement of different types of samples on the simplified instrument, for a large number of purposes where the samples are reasonably flat the results are entirely satisfactory and so it is possible in such cases to utilize the extremely cheap and compact instrument of FIG. 3. It is an advantage of the present invention that it is very flexible and instruments of differing degree of complexity and versatility are available so that the best compromise in terms of instrument versatility versus cost can be chosen in each case.

The two FIGS. 1 and 3 show two different techniques of producing radiation bands of suitable spectral width. It should be understood that this does not means that the single beam instrument of FIG. 1 must always employ a monochromator. It is possible to take the single beam and split it with conventional beam splitters and utilize filters. Such variations are, of course, included within the scope of the present invention as recited in the claims.

I claim:

1. An optical roughness measuring instrument for measuring R.M.S. roughness over a predetermined range comprising, in combination and in optical alignment, a source of optical radiations, means for producing a beam therefrom of suitably low divergence, a roughness sample holder, means for directing said beam onto the surface of the sample in said holder at substantially normal incidence to produce a reflected beam, means for selecting two narrow wavelength bands of the reflected beam, the wavelength of the shorter band being at least ten times as long as the maximum R.M.S. roughness to be measured, a radiation detector, means for imaging the two selected narrow bands of the reflected beam thereon, means for attenuating at least one of the narrow bands, means for chopping the radiation located intermediate the light source and the detector, means for generating a reference signal said means being actuated in synchronism with the chopping means, a phase sensitive A.C. amplifier, means for connecting the output of the radiation detector to the input of said amplifier, and means for indicating polarity and magnitude of the amplifier output whereby said means indicate a function of the relative amounts of radiation in the two bands striking the detector.

2. A optical roughness measuring instrument for measuring R.M.S. roughness over a predetermined range comprising, in combination and in optical alignment, a source of optical radiations, means for producing a narrow beam therefrom of suitably low divergence, a roughness sample holder, means for directing said narrow beam onto the surface of said holder at substantially normal incidence to produce a reflected beam, means for selecting two narrow wavelength bands from the reflected beam, the wavelength of the shorter band being at least approximately thirty times as long as the maximum R.M.S. roughness to be measured, a radiation detector, means for imaging the two selected narrow bands of the reflected beam thereon, means for attenuating at least one of the narrow bands, means for chopping the radiation location intermediate the narrow beam forming means and the detector, means for generating a reference signal said means being actuated in synchronism with the chopping means, a phase sensitive A.C. amplifiers, means for connecting the output of the radiation detector to the input of said amplifier, and means for indicating polarity and magnitude of the amplifier output whereby said means indicate a function of the difference of radiation in the two bands striking the detector.

3. An instrument according to claim 2 in which the attenuating means is in one of the bands only and is a micrometric logarithmic optical attenuator whereby when the attenuator is moved to produce zero output from the amplifier, its movement is a linear function of the square of R.M.S. roughness.

4. An instrument according to claim 3 in which the attenuating means comprise movable optical wedges.

5. An instrument according to claim 1 in which the means for producing two bands of radiation comprises a movable spectrum forming element and a mask with two slits in the dispersed beam positioned to select the pair of radiation bands.

6. An instrument according to claim 5 in which the spectrum forming means is a prism and the position of the slits is such that the wavelength of the shorter band is at least about thirty times the maximum R.M.S. roughness to be measured.

7. An optical measuring instrument of measuring R.M.S. roughness over a predetermined range comprising in combination and in optical alignment a source of optical radiations, means for producing a beam thereof of suitably low divergence, a roughness sample holder, means for directing said beam onto the surface of said holder at substantially normal incidence to produce a reflected beam, two filters passing different narrow wavelength bands in said beam, the wavelength of the shorter band being at least 10 times as long as the maximum R.M.S. roughness to be measured, means for varying the relative cross-sections of the beam striking the filters, radiation detectors in the filtered beams, means for producing a differential output from said detectors and amplifying and indicating means connected thereto.

8. An optical measuring instrument for measuring R.M.S. roughness over a predetermined range comprising in combination and in optical alignment a source of optical radiations, means for producing a beam thereof of suitably low divergence, a roughness sample holder, means for directing said beam onto the surface of said holder at substantially normal incidence to produce a reflected beam, two filters passing different narrow wavelength bands in said beam, the wavelength of the shorter band being at least 30 times as long as the maximum R.M.S. roughness to be measured, means for varying the relative cross-section of the beam striking the filters, radiation detectors in the filtered beams, means for producing a differential output from said detectors and amplifying and indicating means connected thereto.

9. An instrument according to claim 7 in which the filters are semi-circles butting along their diameter and the means for varying the cross-section of the beams is a rotatable mask in front of the filters provided with the semi-circular opening of size comparable to filter size.

10. An instrument according to claim 8 in which the filters are semi-circles butting along their diameter and the means for varying the cross-section of the beams is a rotatable mask in front of the filters provided with the semi-circular opening of size comparable to filter size.

11. An optical roughness measuring instrument for measuring R.M.S. roughness over a predetermined range comprising in combination and in optical alignment a source of optical radiations, means for producing therefrom a beam of suitably low divergence, a roughness sample holder, means for directing said beam onto the surface of a sample in said holder at substantially normal incidence to produce a reflected beam, means for selecting two narrow wavelength bands of the reflected beam, the wavelength of the shorter band being at least 10 times as long as the maximum R.M.S. roughness to be measured, a radiation detector, means for imaging the selected narrow bands of the reflected beam thereon and electronic processing means connected to the output of said radiation detector to produce an output which is a function of the relative amounts of radiation in the two bands striking the detector.

12. An instrument according to claim 11 in which the wavelength of the shorter band is at least about 30 times as long as the maximum R.M.S. roughness to be measured.

References Cited by the Examiner
UNITED STATES PATENTS

| | | | |
|---|---|---|---|
| 2,315,282 | 3/1943 | Snow | 88—14 |
| 2,938,424 | 5/1960 | Herriott | 88—14 |

JEWELL H. PEDERSEN, *Primary Examiner.*